United States Patent
Bryan et al.

(10) Patent No.: US 11,062,262 B2
(45) Date of Patent: *Jul. 13, 2021

(54) SYSTEMS AND METHODS FOR IDENTIFYING AND REMEDYING PRODUCT MIS-SHIPMENTS TO RETAIL STORES

(71) Applicant: Walmart Apollo, LLC, Bentonville, AR (US)

(72) Inventors: Greg A. Bryan, Centerton, AR (US); Cristy C. Brooks, Cassville, MO (US); Benjamin D. Enssle, Bella Vista, AR (US); David B. Brightwell, Bella Vista, AR (US); Jeffrey Kerbs, Bella Vista, AR (US); Jesse L. Eaton, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,463

(22) Filed: Oct. 25, 2019

(65) Prior Publication Data

US 2020/0057985 A1     Feb. 20, 2020

Related U.S. Application Data

(63) Continuation of application No. 16/131,370, filed on Sep. 14, 2018, now Pat. No. 10,496,955.

(Continued)

(51) Int. Cl.
*G06Q 10/08* (2012.01)
*H04W 4/35* (2018.01)

(52) U.S. Cl.
CPC ........... *G06Q 10/087* (2013.01); *G06Q 10/08* (2013.01); *G06Q 10/083* (2013.01);
(Continued)

(58) Field of Classification Search
CPC .... G06Q 10/087; G06Q 10/08; G06Q 10/083; G06Q 10/0833; G06Q 10/0838; H04W 4/35

See application file for complete search history.

(56) References Cited

U.S. PATENT DOCUMENTS 7,653,457 B2    1/2010  Bloom
8,321,302 B2   11/2012  Bauer
(Continued)

FOREIGN PATENT DOCUMENTS

WO        2019133322        7/2019

OTHER PUBLICATIONS

Angeles, Rebecca. "RFID technologies: supply-chain applications and implementation issues." Information systems management 22.1 (2005): 51-65. (Year: 2005).*

(Continued)

*Primary Examiner* — Asfand M Sheikh
(74) *Attorney, Agent, or Firm* — Fitch, Even, Tabin & Flannery, LLP

(57) ABSTRACT

Systems, devices, and methods include an electronic scanning device, an electronic database, and an electronic inventory management device for analyzing products at a retail store in order to detect products at the retail store that are associated with mis-shipments and to adjust perpetual inventory at the retail store in view of a detected mis-shipment.

20 Claims, 3 Drawing Sheets

Related U.S. Application Data

(60) Provisional application No. 62/611,771, filed on Dec. 29, 2017.

(52) U.S. Cl.
CPC ..... *G06Q 10/0833* (2013.01); *G06Q 10/0838* (2013.01); *H04W 4/35* (2018.02)

(56) References Cited

U.S. PATENT DOCUMENTS

| | | | |
|---|---|---|---|
| 8,533,074 | B1 | 9/2013 | Ehrhardt |
| 8,639,384 | B2 | 1/2014 | Young |
| 9,619,777 | B2 | 4/2017 | Delaney |
| 10,496,955 | B2 | 12/2019 | Bryan |
| 2001/0030232 | A1 | 10/2001 | Piatek |
| 2002/0038267 | A1 | 3/2002 | Can |
| 2002/0072988 | A1 | 6/2002 | Aram |
| 2002/0111819 | A1* | 8/2002 | Li ................... G06Q 30/04 705/34 |
| 2003/0097317 | A1 | 5/2003 | Burk |
| 2003/0149674 | A1* | 8/2003 | Good ............... G06Q 10/08 705/402 |
| 2003/0225651 | A1* | 12/2003 | Chen ............... G06Q 40/08 705/36 R |
| 2004/0054607 | A1 | 3/2004 | Waddington |
| 2004/0117196 | A1* | 6/2004 | Brockman ......... G06Q 30/02 705/34 |
| 2004/0243452 | A1* | 12/2004 | Barton ............. G06Q 10/083 705/337 |
| 2005/0149414 | A1 | 7/2005 | Schrodt |
| 2006/0064344 | A1 | 3/2006 | Lidow |
| 2006/0095372 | A1* | 5/2006 | Venkatasubramanian ............ G06Q 20/102 705/40 |
| 2006/0095373 | A1 | 5/2006 | Venkatasubramanian |
| 2007/0061210 | A1 | 3/2007 | Chen |
| 2007/0112650 | A1 | 5/2007 | Klehr |
| 2007/0112651 | A1 | 5/2007 | Swan |
| 2007/0203811 | A1 | 8/2007 | Hoopes |
| 2008/0052205 | A1 | 2/2008 | Dolley |
| 2008/0270270 | A1 | 10/2008 | Ramachandra |
| 2010/0312578 | A1* | 12/2010 | Hardaway ......... G16H 20/10 705/3 |
| 2010/0325020 | A1 | 12/2010 | Junger |
| 2012/0101956 | A1 | 4/2012 | Hyre |
| 2013/0144757 | A1* | 6/2013 | Bauer ............... H01Q 1/22 705/26.61 |
| 2014/0032427 | A1 | 1/2014 | Gannon |
| 2016/0086118 | A1 | 3/2016 | Reed |
| 2016/0171439 | A1* | 6/2016 | Ladden ............. G06F 3/0484 705/340 |
| 2017/0161674 | A1* | 6/2017 | Jones ............... G06Q 10/087 |
| 2017/0193438 | A1 | 7/2017 | Jones |
| 2019/0102686 | A1 | 4/2019 | Yang |
| 2019/0205822 | A1* | 7/2019 | Bryan ............... G06Q 10/0833 |
| 2019/0236694 | A1* | 8/2019 | Balden ............. G06Q 10/06375 |
| 2020/0057985 | A1* | 2/2020 | Bryan ............... H04W 4/35 |

OTHER PUBLICATIONS

Hardgrave, Bill C., John Aloysius, and Sandeep Goyal. "Does RFID improve inventory accuracy? A preliminary analysis." International Journal of RF Technologies 1.1 (2009): 44-56. (Year: 2009).*

"Shelfie Automated Visual Insights for the Retail industry", https://www.youtube.com/watch?v=KmpFEI4hAN0, published on Mar. 20, 2017, pp. 1-.

"Shelfie fully autonomous shelf scanning robot", https://www.youtube.com/watch?v=oFdVudOYloA, published on Mar. 13, 2017, pp. 1-.

Lefebvre, Louis A. et al.; "The Potential of RFID in warehousing activities in a retail industry supply chain"; Journal on Chain and Network Science 5 (2005); 101.

Mccathie, Luke et al.; "Is it the End of Barcodes in Supply Chain Management?"; (2005).

Mogg, Trevor; "Meet Tally, a robot that endlessly roams around and scans retail store aisles"; https://www.digitaltrends.com/cool-tech/tally-robot-simbie-robotics/, posted on Nov. 11, 2015; pp. 1-.

Moorthy, Rahul et al.; "On-Shelf Availability in Retailing"; vol. 116—No. 23; International Journal of Computer Applications; Apr. 2015; pp. 47-51.

PCT; App. No. PCT/US2018/065975; International Search Report and Written Opinion dated Feb. 22, 2019.

Sahin, Evren et al.; "Performance Evaluation of a Traceability System: An Application to the Radio Frequency Identification Technology"; IEEE International Conference on Systems, Man and Cybernetics. vol. 3. IEEE, 2002.

USPTO; U.S. Appl. No. 16/131,370; Notice of Allowance dated Aug. 26, 2019; (pp. 1-14).

* cited by examiner

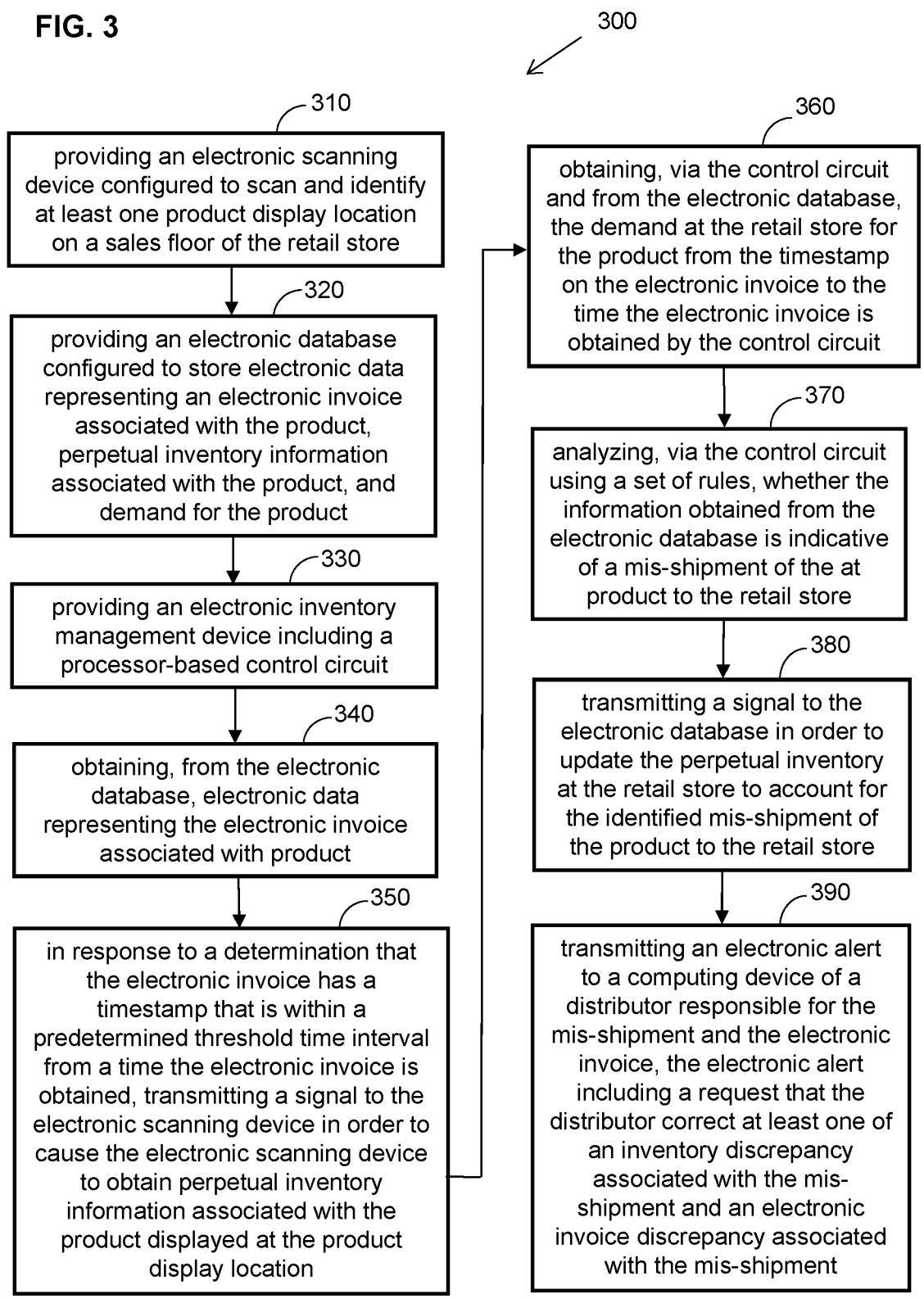

SYSTEMS AND METHODS FOR IDENTIFYING AND REMEDYING PRODUCT MIS-SHIPMENTS TO RETAIL STORES

CROSS-REFERENCE TO RELATED APPLICATIONS

This application is a continuation of U.S. application Ser. No. 16/131,370, filed Sep. 14, 2018, which claims the benefit of U.S. Provisional Application No. 62/611,771, filed Dec. 29, 2017, each of which is incorporated herein by reference in its entirety.

TECHNICAL FIELD

This disclosure relates generally to monitoring product inventory at retail stores, and in particular, to detection and correction of errors associated with mis-shipment of products to retail stores.

BACKGROUND

In a given year, it is not uncommon for distribution centers of a large retailer to ship millions of products to retail stores, and for retail stores to receive and stock millions of products. The products are typically picked, shipped, delivered, and stocked by human operators. Similarly, human operators manually record (e.g., using an electronic device) the tasks they perform with respect to the products as well as inventory information associated with the products.

It is not uncommon for human operators to erroneously pick and/or ship and/or stock a product while entering inventory information that would be appropriate if the correct product was picked and/or shipped and/or stocked by the operator. As a result of such operator error, it is not uncommon for perpetual inventory information at retail stores to be incorrect, with some retail stores stocking more units of a product than indicated by perpetual inventory data and some retail stores stocking less units of a product than indicated by perpetual inventory data. Such inventory errors can lead to situations where a product is indicated to be out of stock is actually in stock and situations where a product is indicated to be in stock is actually out of stock.

BRIEF DESCRIPTION OF THE DRAWINGS

Disclosed herein are embodiments of systems, devices, and methods pertaining to detection of mis-shipments of products to a retail store and correction of perpetual inventory of the retail store in response to the mis-shipments. This description includes drawings, wherein:

FIG. 3 is a flow diagram of a process of detecting mis-shipments of products to a retail store and correcting perpetual inventory of the retail store in response to a detected mis-shipment in accordance with some embodiments.

Figure 1:
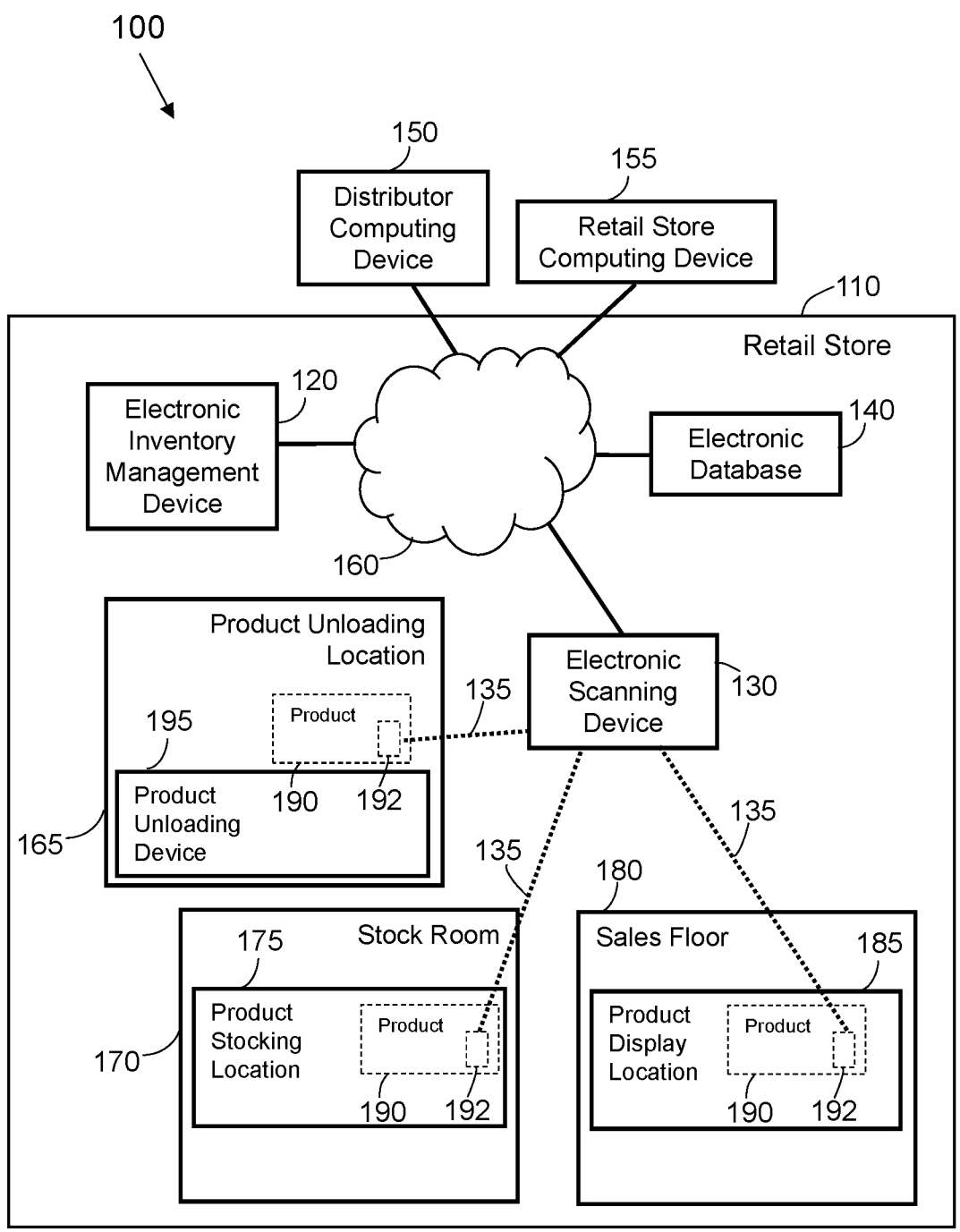
FIG. 1 is a diagram of a system for detecting mis-shipments of products to a retail store and correcting perpetual inventory of the retail store in response to a detected mis-shipment in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein are directed to analysis of products stocked at a retail store in order to detect products at the retail store that are associated with mis-shipments and to adjust perpetual inventory at the retail store accordingly.

In some embodiments, a system for detecting mis-shipments of products to a retail store and correcting perpetual inventory of the retail store in response to a detected mis-shipment includes: an electronic scanning device configured to scan at least one product display location on a sales floor of the retail store, the electronic scanning device including a sensor configured to identify at least one product at the at least one product display location scanned by the electronic scanning device; an electronic database configured to store electronic data representing an electronic invoice associated with the at least one product, perpetual inventory information associated with the at least one product, and a demand for the at least one product; and an electronic inventory management device including a processor-based control circuit. The control circuit is configured to: obtain, from the electronic database, electronic data representing the electronic invoice associated with the at least one product; in response to a determination, by the control circuit, that the electronic invoice associated with the at least one product has a timestamp that is within a predetermined threshold time interval from a time the electronic invoice is obtained, transmit a signal to the electronic scanning device in order to cause the electronic scanning device to scan the at least one product display location on the sales floor in order to obtain perpetual inventory information associated with the at least one product displayed at the at least one product display location; obtain, from the electronic database, the demand at the retail store for the at least one product from the timestamp on the electronic invoice to the time the electronic invoice is obtained by the control circuit; analyze, using a set of rules, whether the obtained demand, the electronic data representing the electronic invoice associated with the at least one product, and the obtained perpetual inventory information associated with the at least one product are indicative of a mis-shipment of the at least one product to the retail store; and in response to an identification by the control circuit of the mis-shipment, to: transmit a signal to the electronic database in order to update the perpetual inventory at the retail store to account for the identified mis-shipment of the at least one product to the retail store; and transmit an electronic alert to a computing device of a distributor responsible for the mis-shipment and the electronic invoice, the electronic alert including a request that the distributor correct at least one of an inventory discrepancy associated with the mis-shipment and an electronic invoice discrepancy associated with the mis-shipment.

In some embodiments, a method of detecting mis-shipments of products to a retail store and correcting perpetual inventory of the retail store in response to a detected mis-shipment, the method comprising: providing an electronic scanning device configured to scan at least one product display location on a sales floor of the retail store, the electronic scanning device including a sensor configured to identify at least one product at the at least one product display location scanned by the electronic scanning device; providing an electronic database configured to store electronic data representing an electronic invoice associated with the at least one product, perpetual inventory information associated with the at least one product, and a demand for the at least one product; providing an electronic inventory management device including a processor-based control circuit; obtaining, via the control circuit and from the electronic database, electronic data representing the electronic invoice associated with the at least one product; in response to a determination, by the control circuit, that the electronic invoice associated with the at least one product has a timestamp that is within a predetermined threshold time interval from a time the electronic invoice is obtained, transmitting, via the control circuit, a signal to the electronic scanning device in order to cause the electronic scanning device to scan the at least one product display location on the sales floor in order to obtain perpetual inventory information associated with the at least one product displayed at the at least one product display location; obtaining, via the control circuit and from the electronic database, the demand at the retail store for the at least one product from the timestamp on the electronic invoice to the time the electronic invoice is obtained by the control circuit; analyzing, via the control circuit using a set of rules, whether the obtained demand, the electronic data representing the electronic invoice associated with the at least one product, and the obtained perpetual inventory information associated with the at least one product are indicative of a mis-shipment of the at least one product to the retail store; and in response to an identification by the control circuit of the mis-shipment: transmitting a signal to the electronic database in order to update the perpetual inventory at the retail store to account for the identified mis-shipment of the at least one product to the retail store; and transmitting an electronic alert to a computing device of a distributor responsible for the mis-shipment and the electronic invoice, the electronic alert including a request that the distributor correct at least one of an inventory discrepancy associated with the mis-shipment and an electronic invoice discrepancy associated with the mis-shipment.

The systems and methods described herein are not limited to scanning products that have been stocked (e.g., on a shelf on the sales floor or on a shelf in the stock room) at a retail store, but include the scanning and associated mis-shipment detection for products that have been delivered and are being unloaded (e.g., from a delivery truck via a ramp or an unloading conveyor) in a product unloading area of the retail store. To that end, in some embodiments, a system for detecting mis-shipments of products to a retail store includes an electronic scanning device configured to scan at least one product being unloaded from a delivery vehicle at the retail store, the electronic scanning device being coupled of one of a moving product unloading conveyor and a product unloading ramp and configured to detect a product identifier of the at least one product; an electronic database configured to store electronic data representing an electronic invoice associated with the at least one product and perpetual inventory information associated with the at least one product; an electronic inventory management device including a processor-based control circuit and configured to: obtain from the electronic scanning device, electronic data identifying the at least one product scanned by the electronic scanning device; obtain, from the electronic database, electronic data representing the electronic invoice associated with the at least one product scanned by the electronic scanning device; analyze, using a set of rules, whether the obtained electronic data identifying the at least one product scanned by the electronic scanning device and the electronic data representing the electronic invoice associated with the at least one product scanned by the electronic scanning device is indicative of a mis-shipment of the at least one product to the retail store; and in response to an identification by the control circuit of the mis-shipment, to: transmit a signal to the electronic database in order to update the perpetual inventory at the retail store to account for the identified mis-shipment of the at least one product to the retail store; and transmit an electronic alert to a computing device of a distributor responsible for the mis-shipment and the electronic invoice, the electronic alert including a request that the distributor correct at least one of an inventory discrepancy associated with the mis-shipment and an electronic invoice discrepancy associated with the mis-shipment The exemplary system 100 in FIG. 1 includes an electronic inventory management device 120 configured generally to manage the inventory of products 190 at the retail store 110. In some embodiments, the electronic inventory management device 120 is configured to manage and/or store electronic data associated with the products 190 in stock (e.g., stocked in a stock room, 170, displayed on the sales floor 180, being unloaded and/or located at the product unloading location 165, etc.) at the retail store 110. The electronic inventory management device 120 in FIG. 1 may be a stationary or portable electronic device, for example, a desktop computer, a laptop computer, a tablet, a mobile phone, or any other electronic device including a processor-based control unit (i.e., control circuit) and configured for data entry and one-way or two-way communication (e.g., over a network 160) with another device located at the retail store 110 (e.g., electronic scanning device 130, electronic database 140, etc.), or with another device at a location remote to the retail store 110 (e.g., distributor computing device 150, another retail store computing device 155, etc.). Similarly, each of the distributor computing device 150 and retail store computing device 155 depicted in FIG. 1 may be a stationary or portable electronic device, for example, a desktop computer, a laptop computer, a tablet, a mobile phone, or any other electronic device including a processor-based control unit (i.e., control circuit) and configured for data entry and one-way or two-way communication (e.g., over the network 160 or another network) with the electronic inventory management device 120, or any other electronic device.

The network 160 may be a wide-area network (WAN), a local area network (LAN), a personal area network (PAN), a wireless local area network (WLAN), or any other wired or wireless internet or intranet network, or combinations of such networks. Communication between various electronic devices of system 100 may take place over hard-wired, cellular, Wi-Fi or Bluetooth networked components, or the like. In some embodiments, one or more electronic devices of system 100 may include cloud-based features, such as cloud-based memory storage.

In the embodiment shown in FIG. 1, the system 100 includes an electronic scanning device 130 in two-way communication with the electronic inventory management device 120 over the network 160. In some aspects, the electronic scanning device 130 is an electronic unmanned vehicle (i.e., robot) that is configured to move (autonomously or while being remotely controlled) throughout the retail store 110 (e.g., in the aisles between shelves) while scanning the products 190 located at product stocking locations 175 in the stock room 170 and/or at product display locations 185 on the sales floor 180 at the retail store 110.

In other embodiments, the electronic scanning device 130 is a stationary electronic scanner that is installed in the stock room 170 and/or on, or above the sales floor 180 at the retail store 110, to scan the product stocking locations 175 and/or products 190 located in the stock room 170, and/or product display locations 185 and/or products 190 located on the sales floor 180. In yet other embodiments, the electronic scanning device 130 is an electronic hand-held scanner that may be carried around and used by workers at the retail store 110 to scan product stocking locations 175 and/or products 190 located in the stock room 170 and/or product display locations 185 and/or products 190 located on the sales floor 180 of the retail store 110.

In yet other embodiments, the electronic scanning device 130 is an electronic scanner that is fixedly and/or movably coupled to a product unloading device 195 at the product unloading location 165 of the retail store 110 to scan the products 190 that are being unloaded from a delivery via the product unloading device 195 and/or products that have been unloaded into a product storage bin or cart via the product unloading device 195. In some aspects, the product unloading device 195 is one or more conveyors coupled to a delivery vehicle and configured to support and move the products 190 as the products 190 are being unloaded from a delivery vehicle. In such embodiments, the electronic scanning device 130 is either directly coupled to one or more of the conveyors, or is positioned adjacent (e.g., on a side of, above, or below) the conveyors to scan the products 190 as they are moving on the conveyors while being unloaded from the delivery vehicle. In some aspects, the product unloading device 195 is a ramp coupled to a delivery vehicle and configured to support the products 190 thereon while the products 190 slide thereon as the products 190 are being unloaded from a delivery vehicle. In such embodiments, the electronic scanning device 130 is either directly coupled to the ramp, or is positioned adjacent (e.g., on a side of, above, or below) the ramp to scan the products 190 as they are moving on the ramp while being unloaded from the delivery vehicle.

In some embodiments, the electronic scanning device 130 is configured to scan one or more products 190 at the retail store 110, and more specifically, to scan one or more product identifiers 192 present on the products 190 or on the packaging of the products 190. In some aspects, after the electronic scanning device 130 scans the identifiers 192 of the products 190 at the retail store 110, the electronic scanning device 130 in configured to transmit the electronic data including the product identifiers 192 of the scanned products 190 over the network 160 to the electronic inventory management device 120. Exemplary electronic scanning devices 130 may include, but are not limited to barcode (e.g., electronic product code (EPC), universal product code (UPC), (European article number) EAN, global trade item number (GTIN) 12 and/or 13, or the like) readers, Digimarc® readers, organic and/or laser markables readers, quick response (QR) code readers, radio frequency identification (RFID) readers, stock keeping unit (SKU) readers, near field communication (NFC) readers, video capture-enabled devices (e.g., cameras, smartwatches, glasses, or the like), electronic tablets, cellular phones, or the like mobile electronic devices. In the embodiment illustrated in FIG. 1, the electronic scanning device 130 may obtain electronic data associated with the scanned product 190 and/or scanned product stocking location 175, product display location 185, or product unloading location 165 by communicating via a communication channel 135 (e.g., radio waves) with the unique product identifiers 192 (e.g., labels, tags, barcodes, RFIDs, SKUs, or the like) located on an exterior (or interior) of products 190, located on an exterior (or interior) of the packaging of the products 190, located at product stocking locations 175 at the retail store 110, product stocking locations 175, and/or product unloading locations 165 at the retail store 110.

With reference to FIG. 1, the electronic inventory management device 120 is coupled via the network 160 to an electronic database 140 configured to store electronic information associated with the products 190 stocked at the retail store 110. While the electronic database 140 of the system 100 of FIG. 1 is illustrated as a separate device from the electronic inventory management device 120, it will be appreciated that the electronic inventory management device 120 and the electronic database 140 may be incorporated into one electronic device in some embodiments. The electronic database 140 may be stored, for example, on non-volatile storage media (e.g., a hard drive, flash drive, or removable optical disk) external or internal relative to the electronic inventory management device 120, or external or internal relative to computing devices separate from the electronic inventory management device 120.

In some embodiments, as described in more detail below, the electronic database 140 may store electronic data including but not limited to product identification data indicating the unique product identifiers 192 of products 190 that are in stock at the retail store 110 (e.g., stored in the stock room 170, displayed on the sales floor 180, located in the product unloading location 165 or another area of the retail store 110, en route (e.g., from a distribution center) to the retail store 110, sold at the retail store 110, etc. In some aspects, the electronic database 140 is configured to store electronic data including but not limited to perpetual inventory data associated with the products 190 at the retail store 110, for example, total number of units on-hand of one or more products 190 at the retail store 110 at a start of a predetermined threshold interval of time; total number of units of the product 190 delivered to the retail store 110 from the start of the predetermined threshold interval of time to a present time; total number of units of the product 190 sold at the retail store 110 from the start of the predetermined threshold interval of time to the present time; and total number of units of the product 190 in stock (i.e., in the stock room 170 and on the sales floor 180) at the retail store 110 at the present time.

In some embodiments, the electronic database 140 stores electronic data representing electronic invoices associated with one or more products 190 delivered to the retail store 110. As will be discussed in more detail below, in some aspects, the data stored on the electronic database 140 is obtained from the electronic database 140 by the electronic inventory management device 120 and analyzed by the control circuit 210 of the electronic inventory management device 120 for purposes of checking the accuracy of the perpetual inventory at the retail store 110 and/or for purposes of checking the accuracy of product deliveries and/or electronic invoices received by the retail store 110. In some aspects, the electronic database 140 stores financial data including but not limited to: receipts/invoices relating to products 190 purchased and/or returned by customers to the retail store 110; receipts/invoices relating to products 190 that were transferred from one retail store 110 to another retail store 110; receipts/invoices relating to products 190 that were delivered from one or more distribution centers to the retail store 110; receipts/invoices relating to broken products 190, product-related claims, donations, etc.

The electronic invoice data associated with the products 190 in stock at the retail store 110 can be received over the network 160 by the electronic database 140. For example, the electronic invoice data can be transmitted for storage to the electronic database 140 from sources including but not limited to: product distribution center, product warehouse, product manufacturer, product shipping company, and/or any other entity contracted to store products 190 prior to their delivery to the retail store 110 and/or any other entity contracted to deliver products 190 to the retail store 110.

In some embodiments, the electronic data indicating the unique product identifiers 192 associated with the products 190 in stock at the retail store 110 is received by (over the network 160) and stored in the electronic database 140, for example, as a result of a scan of a product 190 at the retail store 110 via the electronic scanning device 130. In some aspects, product identification data may be generated and transmitted via the network 160 to the electronic database 140 (directly or via the electronic inventory management device 120) when a product identifier 192 of a product 190 is scanned using the electronic scanning device 130, for example, when a human worker or a mobile robot is performing the task of moving near the shelves and/or bins in the stock room 170, or moving in the aisles and near the shelves on the sales floor 180 while scanning the products 190 stocked in the stock room 170 and/or displayed on the sales floor 180.

In some aspects, product identification data may be generated and transmitted via the network 160 to the electronic database 140 when a stationary electronic scanning device 130 installed in the stock room 170 and/or on the sales floor 180 of the retail store 110 (or a mobile (autonomous or remote-controlled) electronic scanning device 130) scans the product identifier 192 of a product 190 in the stock room 170 and/or on the sales floor 180 of the retail store 110. In some aspects, product identification data may be generated and transmitted via the network 160 to the electronic database 140 when an electronic scanning device 130 in the product unloading location 165 (e.g., coupled to a product unloading device 195 such as a conveyor or a ramp) scans the product identifier 192 of a product 190 that is moving on the product advancement surface of the product unloading device 195 as the product 190 is being unloaded from a delivery vehicle.

Figure 2:
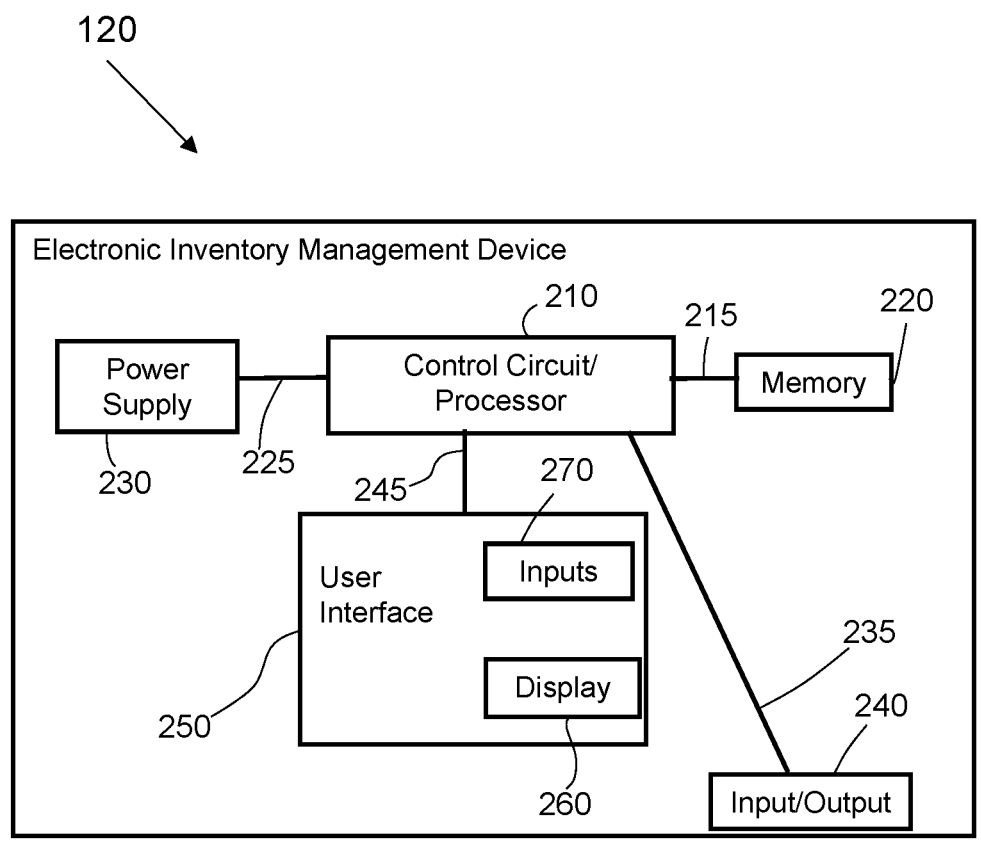
FIG. 2 is a functional block diagram of an electronic inventory management device in accordance with some embodiments.

With reference to FIG. 2, an exemplary electronic inventory management device 120 configured for use with exemplary systems and methods described herein may include a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 210 of the electronic inventory management device 120 is also electrically coupled via a connection 235 to an input/output 240 that can receive, over the network 160, signals from the electronic scanning device 130 and/or electronic database 140 and/or distributor computing device 150 and/or retail store computing device 155, and/or other electronic devices local to the retail store 110 or remote to the retail store 110. The input/output 240 of the electronic inventory management device 120 can also send, over the network 160, signals to the electronic scanning device 130 and/or electronic database 140 and/or other electronic devices local to the retail store 110 or remote to the retail store 110.

In FIG. 2, the processor-based control circuit 210 of the electronic inventory management device 120 is electrically coupled via a connection 245 to a user interface 250, which may include a visual display or display screen 260 (e.g., light-emitting diode (LED) screen) and/or button input 270 that provide the user interface 250 with the ability to permit an operator of the electronic inventory management device 120 to manually control the electronic inventory management device 120 by inputting commands via touch-screen and/or button operation and/or voice commands. For example, in some embodiments, the user interface 250 permits a user to adjust perpetual inventory at the retail store 110 after the control circuit 210 of the electronic inventory management device 120 determines that an adjustment to the perpetual inventory in the electronic database 140 is warranted in response to a detection, by the control circuit 210, that one or more products 190 indicated to be in inventory at the retail store 110 are associated with a mis-shipment. In some embodiments, the user interface 250 permits a user to transmit an electronic alert to a distributor computing device 150 to notify a distributor that one or more products 190 shipped by the distributor to the retail store 110 is associated with a mis-shipment, and to request that the distributor remedy the mis-shipment and/or reconcile the electronic invoice. It will be appreciated that the performance of such functions by the processor-based control circuit 210 is not dependent on a human operator, and that the control circuit 210 may be programmed to perform such functions without a human operator.

As further discussed below, in some aspects, the control circuit 210 of the electronic inventory management device 120 is programmed to analyze one or more sets of rules and to perform various functions associated with determining if the perpetual inventory data stored in the electronic database 140 in association with the products 190 delivered to the retail store 110 is consistent with the on-hand quantities of the products 190 in stock at the retail store 110. In some embodiments, the electronic inventory management device 120 is configured to receive, for example, from the electronic scanning device 130 over the network 160, electronic data (e.g., product identifier 192) indicating the identity of the products 190 scanned at a product display location 185 on the sales floor 180, at a product stocking location 175 in the stock room 170, or at a product unloading location 165 at the retail store 110.

In some embodiments, a scan of the product display location 185 on the sales floor 180 by the electronic scanning device 130 enables the electronic scanning device 130 to physically detect (e.g., by scanning the product identifiers 192 of the products 190) the total number of units of each product 190 scanned at the product display location 185. In some aspects, the scan of the products 190 located on the product stocking location 175 in the stock room 170 enables the electronic scanning device 130 to physically detect (e.g., by scanning the product identifiers 192 of the products 190) the total number of units of the product 190 at the scanned product stocking location 175 in the stock room 170. Similarly, in some aspects, the scan of the products 190 being unloaded from a delivery vehicle via a product unloading device 195 (e.g., a conveyor or ramp) in the product unloading location 165 enables the electronic scanning device 130 to physically detect (e.g., by scanning the product identifiers 192 of the products 190) the total number of units of the product 190 moving on the product unloading device 195 during unloading from a vehicle.

In some embodiments, the electronic scanning device 130 is configured to scan identifiers of product unloading locations 165 (e.g., a conveyor or ramp), product stocking locations 175 (e.g., a shelf or bin) and/or product display locations 185 (e.g., a shelf or another display) instead of identifiers 192 of the products 190 located in such locations. For example, each product unloading location 165, product stocking location 175 and each product display location 185 at the retail store 110 may have a bar code or another identifier configured to be scanned and identified by the electronic scanning device 130. The identifiers of the product unloading locations 165, product stocking locations 175, and the product display locations 185 are stored in the electronic database 140 in association with identifiers and/or known on-hand quantities of the products 190 stocked/displayed at such locations, such that a scan of the product unloading location 165, product stocking locations 175, and/or product display locations 185 by the electronic scanning device 130 reveals the identity and the total number of units of the products 190 located in such locations.

In certain aspects, the control circuit 210 of the electronic inventory management device 120 is also programmed to obtain, from the electronic database 140, electronic data representing the electronic invoice associated with the products 190 that were delivered or are in the process of being delivered to the retail store 110. In some embodiments, the control circuit 210 of the electronic inventory management device 120 is programmed to obtain an electronic invoice from the electronic database 140 based on a timestamp (e.g., data and time) on the electronic invoice. In other words, in certain aspects, the control circuit 210 is programmed to obtain an electronic invoice from the electronic database 140 over the network 160 in response to a determination, by the control circuit 210 that a given electronic invoice has a timestamp that is within a predetermined threshold time interval from a time the electronic invoice is obtained by the control circuit 210.

In some aspects, the predetermined threshold time interval is 72 hours or less (e.g., 72 hours, 60 hours, 48 hours, 36 hours, 24 hours, 12 hours, 6 hours, etc.). As a result, in some embodiments, the control circuit 210 of the electronic inventory management device 120 is programmed to trigger a chain of events advantageously leading to possible product mis-shipment detection shortly (e.g., within 1, 2, or 3 days) after electronic invoices are received by the retail store 110, which then leads to prompt resolution (e.g., several days instead of weeks or months until a scheduled monthly, bi-annual, or annual inventory audit) of any product mis-shipments and any associated perpetual inventory discrepancies.

In some embodiments, after the control circuit 210 of the electronic inventory management device 120 determines that an electronic invoice obtained from the electronic database 140 and associated with a given product 190 delivered to the retail store 110 has a timestamp that is within the predetermined threshold time interval (e.g., 48 hours), the control circuit 210 transmits a signal to the electronic scanning device 130 in order to cause the electronic scanning device to scan a product display location 185 on the sales floor 180 where this product 190 is displayed in order to obtain identifying and/or perpetual inventory and/or electronic invoice data associated with this product 190 for the purpose of detecting any mis-shipments and/or perpetual inventory discrepancies associated with this product 190 based on the obtained data. In some aspects, since the electronic inventory data for a product 190 stored in the electronic database 140 is stored in association with identifying data (e.g., a product identifier 192 such as a barcode, QR code, RFID, etc.) for that product 190, after a product 190 is scanned by the electronic scanning device 130 based on an instruction signal transmitted by the control circuit 210, the product identifier 192 of the scanned product 190 is transmitted to the electronic inventory management device 120 from the electronic scanning device 130 and permits the electronic inventory management device 120 to query the electronic database 140 using the received product identifier 192 and obtain the electronic inventory data associated with the product 190 via the product identifier 192.

In some aspects, the electronic inventory data obtained by the electronic inventory management device 120 from the electronic database 140 may include demand (e.g., total number of units sold to customers and/or ordered by customers according to electronic in-store and/or internet-based purchase receipts) for the product 190 at the retail store 110 during a predetermined time interval (e.g., from the time the product 190 was delivered to the retail store 110 to the time the electronic scanning device 130 scans the product 190). In some aspects, electronic inventory data associated with a scanned product 190 that may be obtained by the electronic inventory management device 120 from the electronic database 140 may include but is not limited to: total number of units of the scanned product 190 stocked at the product stocking location 175 in the stock room 170 and/or displayed at the product display location 185 on the sales floor 180 of the retail store 110; and total number of units of the scanned product 190 delivered to the retail store 110 according to the electronic invoice obtained from the electronic database 140 by the electronic inventory management device 120.

In some aspects, the control circuit 210 of the electronic inventory management device 120 is configured to analyze a set of rules based on a combination of inventory parameters (obtained from the electronic database 140) associated with a scanned product 190 in order to determine whether the obtained inventory information parameters are indicative of a mis-shipment of the product 190 to the retail store 110. For example, in one aspect, the control circuit 210 is programmed to analyze whether the obtained demand at the retail store 110 for the scanned product 190, the electronic invoice information associated with the scanned product 190, and the obtained perpetual inventory information associated with the scanned product 190 are indicative of a mis-shipment of the at product 190 to the retail store 110.

In particular, in one aspect, the control circuit 210 of the electronic inventory management device 120 is programmed with a set of rules configured to cause the control circuit 210 to identify a product mis-shipment upon a determination, by the control circuit 210 that: (1) the total quantity of the product 190 displayed at the scanned product display location 185 on the sales floor 180 of the retail store 110 is zero; (2) the total quantity of the product 190 stocked at a product stocking location 175 in the stock room 170 of the retail store 110 is zero; (3) the total number of units of the product 190 sold at the retail store 110 from the time when the product 190 was delivered to the retail store 110 per the electronic invoice is zero; and (4) the total quantity of the product 190 delivered to the retail store 110 is greater than zero. In other words, in some aspects, a mis-shipment is identified by the control circuit 210 as a result of a determination by the control circuit 210 bases on an analysis of the above set of rules that there is zero on-hand inventory at the retail store 110 of a product 190 no units of which have been sold since a documented (e.g., invoiced) delivery of multiple units of that product 190 to the retail store 110.

By way of example only, the control circuit 210 of the electronic inventory management device 120 is programmed to obtain inventory data and electronic invoice data from the electronic database 140, and to interpret inventory data indicating that the retail store 110 has less on-hand units of a given product 190 than the number of units indicated by an electronic invoice to have been delivered to the retail store 110 at last delivery (when no units of the product 190 have been sold since last delivery) as a discrepancy indicating a mis-shipment event associated with the product 190 (i.e., retail store 110 actually received less units than indicated on the electronic invoice). In another example, the control circuit 210 of the electronic inventory management device 120 is programmed with a set of rules configured to cause the control circuit 210 to interpret inventory data indicating that the retail store 110 has more on-hand units of a product 190 than the number of units indicated by an electronic invoice to have been delivered to the retail store 110 at last delivery (when no units of the product 190 have been sold since last delivery) as a discrepancy indicating a mis-shipment event (i.e., received more units than indicated on the electronic invoice) associated with the product 190.

In yet another example, the control circuit 210 of the electronic inventory management device 120 is programmed with a set of rules configured to cause the control circuit 210 to interpret inventory data indicating that the total number of on-hand units of a given product 190 at the retail store 110 is greater than or less than the difference of the total number of units indicated by an electronic invoice to have been delivered to the retail store 110 at last delivery and the total number of units of the product 190 sold since last delivery as a discrepancy indicating a mis-shipment event associated with the product 190. For instance, the control circuit 210 of the electronic inventory management device 120 is programmed with a set of rules configured to cause the control circuit 210 to interpret inventory data indicating that the total number of on-hand units of a given product 190 at the retail store 110 is 1000 while 1500 units have been delivered to the retail store 110 at last delivery and the total number of units of the product 190 sold since last delivery is 250 as a discrepancy indicating a mis-shipment event associated with the product 190, where 250 less units of the product 190 than indicated in the electronic invoice (i.e., 1250 units) were actually delivered to the retail store 110 in the last delivery. Conversely, the control circuit 210 of the electronic inventory management device 120 is programmed with a set of rules configured to cause the control circuit 210 to interpret inventory data indicating that the total number of on-hand units of a given product 190 at the retail store 110 is 1000 while 1500 units have been delivered to the retail store 110 at last delivery and the total number of units of the product 190 sold since last delivery is 750 as a discrepancy indicating a mis-shipment event associated with the product 190, where 250 units more of the product 190 than indicated in the electronic invoice (i.e., 1750) were actually delivered to the retail store 110 in the last delivery.

In some aspects, in response to a determination by the control circuit 210 of the electronic inventory management device 120 that a given product 190 is associated with a mis-shipment relative to the electronic invoice information and/or perpetual inventory information associated with the product 190, the control circuit 210 is configured to transmit a signal to the electronic database 140 in order to update the perpetual inventory at the retail store 110 to account for the identified mis-shipment of the product 190 to the retail store 110. For example, in the first example above, in response to a determination by the control circuit 210 of the electronic inventory management device 120 that 250 less units of the product 190 were actually shipped to the retail store than indicated in the electronic invoice, the control circuit 210 would transmit a signal to the electronic database 140 in order to update the perpetual inventory at the retail store 110 to reflect that 750 (not 1000) units are on-hand at the retail store 110, not 1000. By the same token, in the second example above, in response to a determination by the control circuit 210 of the electronic inventory management device 120 that 250 more units of the product 190 were actually shipped to the retail store than indicated in the electronic invoice, the control circuit 210 would transmit a signal to the electronic database 140 in order to update the perpetual inventory at the retail store 110 to reflect that 1250 (not 1000) units are on-hand at the retail store 110.

In another example, if a worker at a distribution center tasked (per bill of lading or invoice information) with loading 24 bottles of a diet cola into a truck for delivery to the retail store 110 accidentally loads 24 bottles of regular cola into the delivery truck, upon delivery of the cola bottles to the retail store 110 and after a worker at the retail store 110 updates perpetual inventory at the retail store 110 based on the electronic invoice to indicate that 24 diet cola bottles were delivered to the retail store 110, the retail store 110 will have 24 extra bottles of the regular cola product and will be 24 bottles short of the diet cola product as a result of the mis-shipment caused by operator error at the distribution center. In some embodiments, in response to a determination by the control circuit 210 of the electronic inventory management device 120 that such a mis-shipment has occurred, the control circuit 210 is programmed to transmit a signal to the electronic database 140 in order to update the perpetual inventory at the retail store 110 to reduce the on-hand number of diet cola bottles by 24 and to increase the on-hand number of regular cola bottles by 24 in order to reflect the actual on-hand quantity of diet and regular cola bottles at the retail store 110.

In another example, the control circuit 210 of the electronic inventory management device 120 is programmed with a set of rules configured to cause the control circuit 210 to interpret the fact that the number of units of a product 190 scanned while being unloaded from a delivery vehicle via the product unloading device 195 (e.g., a conveyor or ramp) in the product unloading location 165 does not match the number of units of the product 190 indicated on the no electronic invoice as having been delivered to the retail store 110 by this delivery vehicle at this delivery as a discrepancy indicative that a mis-shipment of the product 190 to the retail store 110 has occurred. In one example, if an electronic scanning device 130 coupled to a product unloading device 195 such as a conveyor scans a product 190 moving on the conveyor as the product is being unloaded from the delivery vehicle, and the product identifier 192 indicates that 50 units of the product 190 are coming off the delivery vehicle on the conveyor while the electronic invoice information obtained from the electronic database 140 in association with the scanned product 190 indicates that 75 units of the product 190 are being delivered, the control circuit 210 is programmed to interpret such a situation as being indicative of a mis-shipment (i.e., actual delivery of 25 units less than indicated on the invoice) of the product 190 to the retail store 110. In some embodiments, in response to a determination by the control circuit 210 of the electronic inventory management device 120 that such a mis-shipment has occurred, the control circuit 210 is programmed to transmit a signal to the electronic database 140 in order to update the perpetual inventory at the retail store 110 to reduce the on-hand number of the product 190 by 25 units to reflect the actual on-hand quantity of the product 190, not the quantity of product 190 expected at the retail store 110 if the product delivery been correct and had the mis-shipment not occurred.

In some embodiments, in response to a determination by the control circuit 210 of the electronic inventory management device 120 that a given product 190 is associated with a mis-shipment relative to the electronic invoice information and/or perpetual inventory information associated with the product 190, the control circuit 210 is configured to transmit an electronic alert to a distributor computing device 150, for example, of a distribution center responsible for the mis-shipment and the electronic invoice and request, via the electronic alert, that the distributor correct the inventory discrepancy and/or the electronic invoice discrepancy associated with the identified mis-shipment. For example, in the cola bottle example above, in response to a determination by the control circuit 210 of the electronic inventory management device 120 that such a mis-shipment has occurred, the control circuit 210 is programmed to transmit an alert to a distributor computing device 150 (e.g., located at a distribution center) in order to inform the distributor that 24 bottles of regular cola instead of 24 bottles of diet cola were mis-shipped by the distribution center to the retail store 110.

In some aspects, this electronic alert includes a request that the distribution center remedy this mis-shipment by re-shipping 24 bottles of diet cola to the retail store 110 with a revised invoice reflecting this new shipment (and, if appropriate, request that the distributor pick up the erroneously delivered 24 bottles of regular cola). In some aspects, after a new, corrective electronic invoice is received by the electronic inventory management device 120 at the retail store 110 from the distributor computing device 150 (or from delivery truck driver), the control circuit 210 of the electronic inventory management device 120 is programmed to transmit the received new electronic invoice to the electronic database 140 in order to update the perpetual inventory at the retail store 110 such that the re-delivered units of a product 190 (e.g., 24 diet cola bottles) are reflected in the perpetual inventory of retail store 110.

In some situations, human error may lead to products 190 being unintentionally shipped to retail store #1 instead of retail store #2, leading to a discrepancy between perpetual inventory and on-hand-inventory information at each of retail stores #1 and #2. For example, if the electronic invoice for retail store #1 required that retail store #1 is to receive 24 diet cola bottles while the electronic invoice for retail store #2 required that retail store #2 is to receive 24 regular cola bottles, but the worker at the distribution center reversed the shipments by mistake and a worker at the retail store 110 incorrectly updated perpetual inventory based on the information in the received electronic invoice, then retail store #1 would have a surplus of 24 regular cola bottles and a deficit of 24 diet cola bottles relative to the electronic invoice and perpetual inventory information associated with retail store #1 and retail store #2 would have a surplus of 24 regular cola bottles and a deficit of 24 regular cola bottles relative to the electronic invoice and perpetual inventory information associated with retail store #1. In some embodiments, the control circuit 210 of the electronic inventory management device 120 is programmed to, upon an identification of the mis-shipment to the retail store 110 (which is retail store #1 in this example), to analyze electronic data (e.g., identity of retail store where the products 190 were intended to be shipped) on the electronic invoice associated with the mis-shipped products 190 in order to identify an intended retail store (e.g., retail store #2) to which the products 190 associated with the mis-shipment were supposed to be delivered per the information on the electronic invoice.

In one aspect, after identifying the retail store (i.e., retail store #2) to which the mis-shipped products 190 (i.e., regular cola bottles) were actually meant to be shipped, the control circuit 210 is programmed to transmit an electronic alert to a retail store computing device 155 at the other retail store (i.e., retail store #2) in order to notify retail store #2 via the alert that the mis-shipment has occurred. As such, the electronic inventory management device 120 of retail store #1 advantageously enables retail store #2 to find out that certain products 190 were mis-shipped to retail store #2 without any scanning of products 190 or product display locations 185 or product stocking locations 175 by an electronic scanning device at retail store #2. In one aspect, the electronic alert transmitted to the retail store computing device 155 at retail store #2 is configured such that it automatically triggers an update of the perpetual inventory at retail store #2 in order to account for the mis-shipment of the cola bottles identified by the electronic inventory management device 120 at retail store #1.

In some embodiments, in response to a determination by the control circuit 210 of the electronic inventory management device 120 that a mis-shipment has occurred in connection with one or more products 190 scanned by the electronic scanning device 130, the control circuit 210 is programmed to output an alert (e.g., to an operator of the electronic inventory management device 120), which may be a visual or an audible alert. In some aspects, the control circuit 210 of the electronic inventory management device 120 is programmed to generate an audible alarm (e.g., via the speaker 280 of the electronic inventory management device 120) indicating that the inventory information for a product 190 scanned at the retail store 110 is inconsistent with the electronic invoice information associated with that product 190. In other aspects, the control circuit 210 of the electronic inventory management device 120 is configured to generate a visible alarm (e.g., via the display 260 of the electronic inventory management device 120) instead or in addition to the audible alarm.

In some embodiments, after the control circuit 210 of the electronic inventory management device 120 generates an alarm associated with detection of a mis-shipment of a product to the retail store 110, the control circuit 210 is programmed to cause the electronic inventory management device 120 to transmit a signal over the network 160 to the electronic database 140 to record the alarm and/or detected mis-shipment. As a result, the electronic database 140 would store electronic data that can be used to determine a metric for the shipment accuracy of various distribution centers that deliver products 190 to the retail store 110 and/or for the quality of stocking work by inventory management associates at the retail store 110.

With reference to FIGS. 1-3, one method 300 of operation of the system 100 for detecting mis-shipments of products 190 to a retail store 110 and correcting perpetual inventory of the retail store 110 in response to a detected mis-shipment includes providing an electronic scanning device 130 configured to scan one or more product display locations 185 on a sales floor 180 of the retail store 110 (step 310). To that end, the electronic scanning device 130 includes a sensor configured to identify one or more products 190 at the one or more product display locations 185 scanned by the electronic scanning device 130. As discussed above, the electronic scanning device 130 may include one or more sensors/readers configured to recognize one or more product identifiers 192 (e.g., a barcode, QR code, RFID, SKU, NFC, and the like).

In some embodiments, as the mobile unmanned electronic scanning device 130 (e.g., a unmanned ground vehicle or an unmanned aerial vehicle (i.e., drone)) moves (e.g., drives, rolls, flies, hovers, etc.) in proximity to the product display shelves (e.g., within an aisle) on the sales floor 180 of the retail store 110, the electronic scanning device 130 scans the products 190 and detects product identifiers 192 thereon. As discussed above, in some implementations, the electronic scanning device 130 is configured to scan identifiers of product stocking locations 175 and/or product display locations 185 instead of identifiers 192 of the products 190 stored in such locations. As discussed above, the electronic scanning device 130 may alternatively be implemented as a stationary product scanner or a mobile hand-held scanner that may be used to scan products 190 being unloaded from a delivery vehicle via the product unloading device 195 in the product unloading location 165 of the retail store 110, products 190 stocked in the stock room 170 of the retail store 110 and/or products displayed on the sales floor 180 of the retail store 110.

In some aspects, after the electronic scanning device 130 scans the products 190 and acquires electronic data representative of the product identifiers 192 of the scanned products 190, the electronic scanning device 130 transmits such data over the network 160 to the electronic inventory management device 120. To that end, the exemplary method of FIG. 3 includes providing an electronic database 140 configured to store electronic data representing an electronic invoice associated with the product 190, perpetual inventory information associated with the product 190, and demand for the product 190 (step 320). As discussed above, in some embodiments, the electronic database 140 records and stores identifying data (e.g., serial number, UPC code, or the like) associated with every product 190 stocked at the retail store 110.

With reference to FIG. 3, the exemplary method 300 further includes providing an electronic inventory management device 120 including a processor-based control circuit 210 (step 330) and obtaining, via the control circuit 210 and from the electronic database 140, electronic data representing the electronic invoice associated with one or more products 190 (step 340). As discussed above, the control circuit 210 of the electronic inventory management device 120 is programmed, in some embodiments, to verify electronic invoice and perpetual inventory information within a predetermined threshold time interval of the retail store receiving the product shipment and/or electronic invoice associated with that shipment. This advantageously facilitates prompt audit (e.g., within 24 hours, 48 hours, 72 hours, etc.) of the electronic invoices received by the retail store 110 and provides for timely resolution of product mis-shipments to the retail store 110. In some aspects, in response to a determination, by the control circuit 210 of the electronic inventory management device 120, that the electronic invoice associated with one or more products 190 has a timestamp that is within a predetermined threshold time interval from a time the electronic invoice is obtained by the control circuit 210, the method 300 includes transmitting, via the control circuit 210, a signal to the electronic scanning device 130 in order to cause the electronic scanning device 130 to scan one or more product display locations 185 on the sales floor 180 in order to obtain perpetual inventory information associated with one or more products 190 associated with the electronic invoice and displayed at the product display location 185 (step 350).

The method 300 of FIG. 3 further includes obtaining, via the control circuit 210 of the electronic inventory management device 120 and from the electronic database 140, the demand at the retail store 110 for the product 190 from the time/date indicated by the timestamp on the electronic invoice associated with the product 190 (i.e., which indicates the date/time the product 190 was delivered to the retail store 110) to the time the electronic invoice is obtained from the electronic database 140 by the control circuit 210 (step 360). As discussed above, the obtained demand may include but is not limited to total number of units of the product 190 actually sold to customers at the retail store 110 since the product delivery associated with the electronic invoice and/or total number of units of the product 190 ordered over the internet by customers of the retail store 110. After the parameters (e.g., electronic invoice, perpetual inventory, consumer demand, etc.) specified in the set of rules associated with a mis-shipment detection decision are obtained the control circuit 210, the method 300 further includes analyzing, via the control circuit 210 using the set of rules, whether the demand, electronic data representing the electronic invoice associated with the product 190, and obtained perpetual inventory information associated with product 190 are indicative of a mis-shipment of the product 190 to the retail store 110 (step 370).

In response to an identification by the control circuit 210 of the electronic inventory management device 120 of a mis-shipment to the retail store 110 of one or more products 190, the method 300 illustrated in FIG. 3 includes transmitting a signal to the electronic database 140 in order to update the perpetual inventory at the retail store 110 to account for the identified mis-shipment of one or more products 190 to the retail store 110 (step 380). As a result, in some aspects, the perpetual inventory of the retail store 110 is adjusted to reflect the mis-shipment and to correctly reflect the actual on-hand inventory of the product 190 at the retail store 110 resulting from the mis-shipment.

In the illustrated embodiment, the method 300 further includes transmitting an electronic alert to a distributor computing device 150 of a distributor (e.g., distribution center) responsible for the mis-shipment and the electronic invoice (step 390). In the embodiment illustrated in FIG. 3, the electronic alert includes a request that the distributor correct at least one of an inventory discrepancy associated with the mis-shipment and an electronic invoice discrepancy associated with the mis-shipment. As described above, such correction by the distributor may include re-shipment of the correct number of units of the product 190 to the retail store 110 and submission to the retail store 110 of a new electronic invoice, based on which the electronic inventory management device 120 communicates with the electronic database 140 in order to update perpetual inventory at the retail store 110 to reflect the remedial measures taken by the distributor who was initially responsible for the mis-shipment.

The systems and methods described herein analyze products at retail stores and detect products that are associated with mis-shipments resulting from human error or other causes. The methods and systems described herein significantly increase the timeliness with which such mis-shipment errors can be detected by the retail stores, thereby enabling the retail stores to take responsive measures, and adjust their inventory and/or accounting databases accordingly, thereby advantageously providing for efficient perpetual inventory monitoring and correction at a lower cost for the retailer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting mis-shipments of products to a retail store and correcting perpetual inventory of the retail store in response to a detected mis-shipment, the system comprising:
   an electronic scanning device configured to scan at least one product display location on a sales floor of the retail store, the electronic scanning device including a sensor configured to identify at least one product at the at least one product display location scanned by the electronic scanning device;
   an electronic database configured to store electronic data representing an electronic invoice associated with the at least one product, perpetual inventory information associated with the at least one product, and a demand for the at least one product;
   an electronic inventory management device including a processor-based control circuit and a user interface comprising at least one of a display screen and a speaker, the control circuit configured to:
      obtain, from the electronic database, electronic data representing the electronic invoice associated with the at least one product;
      in response to a scan of the at least one product display location on the sales floor by the electronic scanning device, obtain, from the electronic scanning device, perpetual inventory information associated with the at least one product displayed at the at least one product display location;
      obtain, from the electronic database, the demand at the retail store for the at least one product from a time when the at least one product associated with the electronic invoice is delivered to the retail store to a time the electronic invoice is obtained by the control circuit;
      analyze, using a set of rules, whether the obtained demand, the electronic data representing the electronic invoice associated with the at least one product, and the obtained perpetual inventory information associated with the at least one product are indicative of a mis-shipment of the at least one product to the retail store; and
      in response to an identification by the control circuit of the mis-shipment;
      transmit a signal to the electronic database in order to update the perpetual inventory at the retail store to account for the identified mis-shipment of the at least one product to the retail store;
      generate an electronic alert indicating that a mis-shipment has been identified by the control circuit; and
      transmit a signal to the user interface of the computing device to cause the user interface to output the electronic alert via at least one of the display screen of the computing device and the speaker of the computing device.

2. The system of claim 1, wherein the electronic scanning device comprises at least one of a hand-held electronic scanning device, and a shelf-mounted electronic scanning device; a mobile unmanned electronic scanning device, and a product conveyor-mounted electronic scanning device.

3. The system of claim 1, wherein the perpetual inventory information obtained by the electronic scanning device from the at least one product display location scanned by the electronic scanning device includes electronic data indicating a total number of units of the at least one product at the scanned at least one product display location on the sales floor.

4. The system of claim 1, wherein the electronic scanning device is configured to:
   scan at least one product stocking location in a stock room of the retail store, the electronic scanning device including a sensor configured to identify at least one product at the at least one product stocking location scanned by the electronic scanning device; and
   obtain perpetual inventory information associated with the at least one product stocked at the at least one product stocking location;
   wherein the perpetual inventory information obtained by the electronic scanning device from the at least one product stocking location scanned by the electronic scanning device includes electronic data indicating a total number of units of the at least one product at the scanned at least one product stocking location in the stock room.

5. The system of claim 1, wherein the electronic scanning device is configured to transmit the obtained perpetual inventory information associated with the at least one product displayed at the at least one product display location to the electronic database.

6. The system of claim 1,
wherein the control circuit is configured to obtain, from the electronic database, perpetual inventory information indicating a total quantity of the at least one product stocked in the stock room of the retail store;
wherein the electronic invoice includes a total quantity of the at least one product delivered to the retail store per the electronic invoice; and
wherein the demand includes a total number of units of the at least one product sold at the retail store from a time when the at least one product was delivered to the retail store per the electronic invoice.

7. The system of claim 6, wherein the control circuit of the electronic inventory management device is configured to identify the mis-shipment upon a determination, by the control circuit, that:
the total quantity of the at least one product displayed at the at least one product display location on the sales floor is zero;
the total quantity of the at least one product stocked at a product stocking location in the stock room of the retail store is zero;
the total quantity of the at least one product delivered to the retail store is greater than zero; and
the total number of units of the at least one product sold at the retail store from the time when the at least one product was delivered to the retail store per the electronic invoice is zero.

8. The system of claim 1, wherein the electronic inventory management device is further configured to:
transmit an electronic alert to a computing device of a distributor responsible for the mis-shipment and the electronic invoice, the electronic alert including a request that the distributor correct at least one of an inventory discrepancy associated with the mis-shipment and an electronic invoice discrepancy associated with the mis-shipment;
receive, from the computing device of the distributor and in response to the transmission of the alert by the electronic inventory management device, a new electronic invoice reflecting corrected information relative to the mis-shipment identified by the control circuit; and
transmit the received new electronic invoice to the electronic database in order to update the perpetual inventory at the retail store.

9. The system of claim 1, wherein the control circuit is further configured to, upon an identification of the mis-shipment of the at least one product to the retail store, to:
analyze the electronic invoice associated with the at least one product associated with the mis-shipment in order to identify an intended retail store to which the at least one product associated with the mis-shipment was indicated for shipment on the electronic invoice; and
cause the electronic inventory management device to transmit an electronic alert to a computing device at the intended retail store, the electronic alert including a notification that the at least one product intended to be shipped by the distributor to the intended retail store was mis-shipped to another retail store.

10. The system of claim 9, wherein the electronic alert transmitted to the computing device at the intended retail store is configured to update the perpetual inventory at the intended retail store to account for the identified mis-shipment of the at least one product.

11. A method of detecting mis-shipments of products to a retail store and correcting perpetual inventory of the retail store in response to a detected mis-shipment, the method comprising:
providing an electronic scanning device configured to scan at least one product display location on a sales floor of the retail store, the electronic scanning device including a sensor configured to identify at least one product at the at least one product display location scanned by the electronic scanning device;
providing an electronic database configured to store electronic data representing an electronic invoice associated with the at least one product, perpetual inventory information associated with the at least one product, and a demand for the at least one product;
providing an electronic inventory management device including a processor-based control circuit and a user interface comprising at least one of a display screen and a speaker;
obtaining, via the control circuit and from the electronic database, electronic data representing the electronic invoice associated with the at least one product;
in response to a scan the at least one product display location on the sales floor by the electronic scanning device, obtain, by the electronic inventory management device and from the electronic scanning device, perpetual inventory information associated with the at least one product displayed at the at least one product display location;
obtaining, by the electronic inventory management device and from the electronic database, the demand at the retail store for the at least one product from a time when the at least one product associated with the electronic invoice is delivered to the retail store to the time the electronic invoice is obtained by the electronic inventory management device;
analyzing, via the control circuit using a set of rules, whether the obtained demand, the electronic data representing the electronic invoice associated with the at least one product, and the obtained perpetual inventory information associated with the at least one product are indicative of a mis-shipment of the at least one product to the retail store;
in response to an identification by the control circuit of the mis-shipment, transmitting a signal to the electronic database in order to update the perpetual inventory at the retail store to account for the identified mis-shipment of the at least one product to the retail store;
generating, by the control circuit, an electronic alert indicating that a mis-shipment has been identified by the control circuit; and
transmitting, by the control circuit, a signal to the user interface of the computing device to cause the user interface to output the electronic alert via at least one of the display screen of the computing device and the speaker of the computing device.

12. The method of claim 11, wherein the electronic scanning device comprises at least one of a hand-held electronic scanning device, a shelf-mounted electronic scanning device, a mobile unmanned electronic scanning device, and a product conveyor-mounted electronic scanning device.

13. The method of claim 11, wherein the perpetual inventory information obtained by the electronic scanning device from the at least one product display location scanned by the electronic scanning device includes electronic data indicating a total number of units of the at least one product at the scanned at least one product display location on the sales floor.

14. The method of claim 11, further comprising:
scanning, via the electronic scanning device, at least one product stocking location in a stock room of the retail store, the electronic scanning device including a sensor configured to identify at least one product at the at least one product stocking location scanned by the electronic scanning device; and
obtaining, via the electronic scanning device, perpetual inventory information associated with the at least one product stocked at the at least one product stocking location;
wherein the perpetual inventory information obtained by the electronic scanning device from the at least one product stocking location scanned by the electronic scanning device includes electronic data indicating a total number of units of the at least one product at the scanned at least one product stocking location in the stock room.

15. The method of claim 11, further comprising transmitting, via the electronic scanning device, the obtained perpetual inventory information associated with the at least one product displayed at the at least one product display location to the electronic database.

16. The method of claim 11,
obtaining, via the electronic inventory management device and from the electronic database, perpetual inventory information indicating a total quantity of the at least one product stocked in the stock room of the retail store;
wherein the electronic invoice includes a total quantity of the at least one product delivered to the retail store per the electronic invoice; and
wherein the demand includes a total number of units of the at least one product sold at the retail store from a time when the at least one product was delivered to the retail store per the electronic invoice.

17. The method of claim 16, further comprising:
identifying, via the control circuit, the mis-shipment upon a determination, by the control circuit, that:
the total quantity of the at least one product displayed at the at least one product display location on the sales floor is zero;
the total quantity of the at least one product stocked at a product stocking location in the stock room of the retail store is zero;
the total quantity of the at least one product delivered to the retail store is greater than zero; and
the total number of units of the at least one product sold at the retail store from the time when the at least one product was delivered to the retail store per the electronic invoice is zero.

18. The method of claim 11, further comprising:
transmitting an electronic alert to a computing device of a distributor responsible for the mis-shipment and the electronic invoice, the electronic alert including a request that the distributor correct at least one of an inventory discrepancy associated with the mis-shipment and an electronic invoice discrepancy associated with the mis-shipment;
receiving, by the electronic inventory management device and from the computing device of the distributor and in response to the transmission of the alert by the electronic inventory management device, a new electronic invoice reflecting corrected information relative to the mis-shipment identified by the control circuit; and
transmitting the received new electronic invoice from the electronic inventory management device to the electronic database in order to update the perpetual inventory at the retail store.

19. The method of claim 11, further comprising:
upon an identification by the control circuit of the mis-shipment of the at least one product to the retail store;
analyzing, via the control circuit, the electronic invoice associated with the at least one product associated with the mis-shipment in order to identify an intended retail store to which the at least one product associated with the mis-shipment was indicated for shipment on the electronic invoice; and
transmitting, from the electronic inventory management device, an electronic alert to a computing device at the intended retail store, the electronic alert including a notification that the at least one product intended to be shipped by the distributor to the intended retail store was mis-shipped to another retail store.

20. The method of claim 19, wherein the electronic alert transmitted to the computing device at the intended retail store is configured to update the perpetual inventory at the intended retail store to account for the identified mis-shipment of the at least one product.

* * * * *

UNITED STATES PATENT AND TRADEMARK OFFICE
CERTIFICATE OF CORRECTION

PATENT NO. : 11,062,262 B2
APPLICATION NO. : 16/664463
DATED : July 13, 2021
INVENTOR(S) : Greg A. Bryan et al.

Page 1 of 1

It is certified that error appears in the above-identified patent and that said Letters Patent is hereby corrected as shown below:

In the Claims

On Column 18, Line 27, delete "mis-shipment;" and insert --mis-shipment:--, therefor.
On Column 22, Line 29, delete "store;" and insert --store:--, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*